(12) United States Patent
East et al.

(10) Patent No.: US 8,914,307 B2
(45) Date of Patent: Dec. 16, 2014

(54) PROCESSING LOAN TRANSACTIONS

(75) Inventors: Twila Dawn East, Jacksonville, FL (US); Heather Leigh Holeman, Charlotte, NC (US); Matthew John Rossi, Charlotte, NC (US); Juanita Long Sheppard, Greensboro, NC (US)

(73) Assignee: Bank of America Corporation, Charlotte, NC (US)

( * ) Notice: Subject to any disclaimer, the term of this patent is extended or adjusted under 35 U.S.C. 154(b) by 275 days.

(21) Appl. No.: 12/941,920

(22) Filed: Nov. 8, 2010

(65) Prior Publication Data

US 2012/0116971 A1    May 10, 2012

(51) Int. Cl.
 *G06Q 40/02* (2012.01)
 *G06Q 20/10* (2012.01)
 *G06Q 20/40* (2012.01)

(52) U.S. Cl.
 CPC ............... *G06Q 40/02* (2013.01); *G06Q 20/10* (2013.01); *G06Q 20/40* (2013.01)
 USPC .................... 705/44; 705/34; 705/38; 705/43; 705/80

(58) Field of Classification Search
 None
 See application file for complete search history.

(56) References Cited

U.S. PATENT DOCUMENTS

| | | | |
|---|---|---|---|
| 4,404,649 A * | 9/1983 | Nunley et al. ................. | 235/379 |
| 6,021,397 A | 2/2000 | Jones et al. | |
| 6,112,190 A | 8/2000 | Fletcher et al. | |
| 6,920,434 B1 | 7/2005 | Cossette | |
| 7,035,821 B1 * | 4/2006 | Smith et al. ..................... | 705/39 |
| 7,379,912 B1 * | 5/2008 | Camin et al. .................... | 705/38 |
| 7,395,239 B1 * | 7/2008 | Riseman ......................... | 705/38 |
| 7,702,575 B1 | 4/2010 | Lofton et al. | |
| 7,765,291 B1 | 7/2010 | Khan et al. | |
| 2001/0042785 A1 | 11/2001 | Walker et al. | |
| 2001/0054022 A1 | 12/2001 | Louie et al. | |
| 2002/0042773 A1 | 4/2002 | Fugitte et al. | |
| 2003/0018558 A1 | 1/2003 | Heffner et al. | |
| 2003/0033241 A1 * | 2/2003 | Harari ............................. | 705/38 |
| 2003/0149659 A1 | 8/2003 | Danaher et al. | |
| 2004/0117302 A1 | 6/2004 | Weichert et al. | |
| 2004/0199467 A1 * | 10/2004 | Martin et al. .................. | 705/43 |
| 2005/0027651 A1 | 2/2005 | DeVault | |
| 2005/0080721 A1 | 4/2005 | Kearney et al. | |
| 2005/0086176 A1 | 4/2005 | Dahlgren et al. | |
| 2005/0119908 A1 | 6/2005 | Hippe et al. | |

(Continued)

FOREIGN PATENT DOCUMENTS

| WO | WO 99/59084 | * 11/1999 | ............. G06F 17/30 |
|---|---|---|---|
| WO | 02/11089 | 2/2002 | |

OTHER PUBLICATIONS

*Power Up with CashPro Online*; Bank of America Merrill Lynch; AA-AF-0061ED Aug. 2010; 2 pages.

(Continued)

*Primary Examiner* — Robert R Niquette
(74) *Attorney, Agent, or Firm* — Michael A. Springs

(57) ABSTRACT

A method includes receiving, at a client access module, a request from a client to process a loan transaction, wherein the request is associated with a particular loan system. The method also includes determining, by a processor, the particular loan system associated with the request, determining one or more rules associated with the request and a selected one of the client access module and the particular loan system, and applying, by the processor, the one or more determined rules to the request using the account information.

26 Claims, 6 Drawing Sheets

(56) References Cited

U.S. PATENT DOCUMENTS

| | | | |
|---|---|---|---|
| 2006/0004651 A1* | 1/2006 | Corr et al. | 705/38 |
| 2006/0031159 A1 | 2/2006 | Minot et al. | |
| 2006/0069640 A1* | 3/2006 | Fitzgerald et al. | 705/38 |
| 2006/0131395 A1* | 6/2006 | Potts et al. | 235/380 |
| 2006/0224501 A1* | 10/2006 | Louis | 705/38 |
| 2006/0287953 A1 | 12/2006 | Chauhan | |
| 2007/0016518 A1* | 1/2007 | Atkinson et al. | 705/38 |
| 2007/0080207 A1* | 4/2007 | Williams | 235/379 |
| 2007/0198401 A1 | 8/2007 | Kunz | |
| 2007/0198403 A1* | 8/2007 | Aloni et al. | 705/39 |
| 2007/0203881 A1 | 8/2007 | Schaad et al. | |
| 2007/0244808 A1 | 10/2007 | Eze | |
| 2007/0288362 A1* | 12/2007 | Pollock et al. | 705/38 |
| 2007/0294184 A1 | 12/2007 | Lee et al. | |
| 2008/0086410 A1* | 4/2008 | MacGuire | 705/38 |
| 2008/0183515 A1* | 7/2008 | Chheda et al. | 705/7 |
| 2008/0270246 A1 | 10/2008 | Chen | |
| 2009/0254487 A1* | 10/2009 | Dhar et al. | 705/80 |
| 2009/0327120 A1 | 12/2009 | Eze et al. | |
| 2009/0327133 A1 | 12/2009 | Aharoni et al. | |
| 2010/0082477 A1* | 4/2010 | Huston et al. | 705/38 |
| 2010/0142382 A1 | 6/2010 | Jungck et al. | |
| 2010/0217697 A1* | 8/2010 | MacGuire | 705/34 |
| 2012/0030091 A1 | 2/2012 | Hu et al. | |

OTHER PUBLICATIONS

*Enhanced CashPro Online aims to provide users with more power*; Sponsored Statement; Bank of America Merrill Lynch; one page. Jun. 2010.

*AFS Commercial Loan Origination*; Automated Financial Systems, Inc. 2000-2011; 2 pages, printed May 17, 2011.

*Asset Servicing/Accounting Products*; Automated Financial Systems, Inc. 2000-2011; 2 pages, printed May 17, 2011.

*CSC's Hogan Core Processing System Puts Innovation to Work for the World's Top Banks*; CSC: Put Innovation to Work; www.csc.com; 4 pages, Copyright 2009.

"Asset Based Lending CashPro® Online," User Guide, *Bank of America Merrill Lynch*, 2009, 30 pages.

U.S. Appl. No. 12/941,820 entitled, "Processing Loan Transactions," filed Nov. 8, 2010, 39 pages.

U.S. Appl. No. 12/941,963 entitled, "Processing Loan Transactions," filed Nov. 8, 2010, 39 pages.

U.S. Appl. No. 13/013,958 entitled, "Providing an Interface to Loan Information," filed Jan. 26, 2011, 25 pages.

U.S. Appl. No. 12/941,820, USPTO Office Action dated Jan. 12, 2012.

U.S. Appl. No. 12/941,963, USPTO Office Action dated Feb. 29, 2012.

U.S. Appl. No. 13/013,958, USPTO Office Action dated Apr. 4, 2012.

Carleton et al., U.S. Appl. No. 12/941,820, Final Office Action from the US Patent Office dated May 18, 2012.

Lensink et al., U.S. Appl. No. 13/013,958, Final Rejection, U.S. Patent and Trademark Office, 25 pages.

Carleton et al., U.S. Appl. No. 12/941,820, Non-Final Rejection, US Patent and Trademark Office, Oct. 12, 2012.

East et al., U.S. Appl. No. 12/941,963, Applicant-Initiated Interview Summary, U.S. Patent and Trademark Office, May 24, 2012.

U.S. Patent and Trademark Office Official Action in U.S. Appl. No. 12/941,820 dated Mar. 14, 2013, 13 pages.

\* cited by examiner

FIG. 3A

| Balances | Payments | Advances |
|---|---|---|
| | 304 | 306 |

Commercial Credit Balances

| Customer Number | Obligation Number | Obligation Type | Commitment Amount | Available Amount* | Outstanding Principal Amount* | Maturity Date |
|---|---|---|---|---|---|---|
| 10-0000012XXXX | ⊞ 0000000265 | Revolving Credit Facility | 1,000,000.00 | 538,000.00 | 462,000.00 | 08/04/2010 |
| 10-0000012XXXX | 0000000281 | Term Loan | | | 122,381.76 | 05/12/2013 |
| 10-0000012XXXX | 0000000331 | Term Loan | | | 0.00 | 04/10/2010 |
| 10-0000012XXXX | 0000000349 | Term Loan | | | 6,158.88 | 10/24/2010 |
| 10-0000012XXXX | 0000000356 | Term Loan | | | 27,111.74 | 04/09/2011 |
| 10-0000012XXXX | ⊞ 0000000364 | Credit Facility | 0.00 | 0.00 | 118,635.70 | 05/22/2009 |
| 10-0000012XXXX | 0000000380 | Term Loan | | | 331,602.40 | 10/14/2023 |
| 10-0000012XXXX | ⊞ 0000000398 | Credit Facility | 225,000.00 | 19,370.53 | 205,629.47 | 07/20/2010 |
| 10-0000012XXXX | ⊞ 0000000026 | Revolving Credit Facility | 80,000,000.00 | 6,058,051.01 | 73,941,948.99 | 09/01/2010 |
| 10-0000012XXXX | ⊞ 0000000091 | Revolving Credit Facility | 19,700,000.00 | 18,899,880.00 | 700,120.00 | 07/01/2013 |

Invoices

| Customer Number | Invoice Number | Due Date | Obligation Number | Total Due | | Statement Date |
|---|---|---|---|---|---|---|
| 10-0000012XXXX | 1000000001 | 04/09/2010 | 0000000356 | 3,104.93 | Auto-debit | 03/28/2010 |
| 10-0000012XXXX | 1000000001 | 04/10/2010 | 0000000331 | 1,997.68 | Auto-debit | 03/29/2010 |
| 10-0000012XXXX | 1000000001 | 04/12/2010 | 0000000281 | 4,626.52 | Auto-debit | 03/31/2010 |
| 10-0000012XXXX | 1000000001 | 04/14/2010 | 0000000380 | 2,957.64 | Auto-debit | 04/04/2010 |
| 10-0000012XXXX | 1000000001 | 04/20/2010 | 0000000406 | 536.65 | Auto-debit | 04/08/2010 |
| 10-0000012XXXX | 1000000001 | 04/22/2010 | 0000000372 | 2,871.03 | Auto-debit | 04/11/2010 |
| 10-0000012XXXX | 1000000001 | 04/24/2010 | 0000000349 | 2,143.03 | Auto-debit | 04/12/2010 |
| 10-0000012XXXX | 1000000001 | 05/05/2010 | 0000000273 | 252.67 | Auto-debit | 04/25/2010 |
| 10-0000012XXXX | 1000000001 | 05/09/2010 | 0000000356 | 3,104.93 | Auto-debit | 04/27/2010 |
| 10-0000012XXXX | 1000000001 | 05/10/2010 | 0000000331 | 2,008.85 | Auto-debit | 04/28/2010 |
| 10-0000012XXXX | 1000000001 | 05/12/2010 | 0000000281 | 4,626.52 | Auto-debit | 04/30/2010 |
| 10-0000012XXXX | 1000000001 | 05/14/2010 | 0000000380 | 2,957.84 | Auto-debit | 05/02/2010 |

| Balances | Payments | Advances |

| Invoice Payments | Additional Loan Payments |

Make a Payment

1. Select the invoice to pay:

|  | Customer Number | Invoice Number | Total Due |
|---|---|---|---|
| ○ | 10-0000012XXXX | 1000000001 | 450,000.00 |
| ○ | 10-0000012XXXX | 1000000001 | 22,495.32 |

[ Next ] [ Cancel ]

| Balances | Payments | Advances |

| Invoice Payments | Additional Loan Payments |

Make a Payment

1. Pay this invoice:
   Customer Number:   10-0000012XXXX
   Invoice Number:    1000000001
   Due Date:          08/04/2010
   Total Due:         450,000.00

2. Select the deposit account to pay from:

|  | Account Number | Available Amount |
|---|---|---|
| ○ | 000123456XXXX | 450,000.00 |
| ○ | 000098765XXXX | 22,495.32 |

[ Next ] [ Cancel ]

*FIG. 3C*

PROCESSING LOAN TRANSACTIONS

TECHNICAL FIELD OF THE INVENTION

This invention relates generally to financial systems, and, more specifically, to processing loan transactions.

BACKGROUND OF THE INVENTION

Entities interact with financial institutions to conduct financial transactions, such as loan servicing. Existing facilities for conducting these financial transactions are associated with various complexities and inefficiencies.

SUMMARY OF THE INVENTION

In accordance with the teachings of the present disclosure, disadvantages and problems associated with processing loan transactions may be reduced or eliminated.

According to an exemplary embodiment, a method includes receiving, at a client access module, a request from a client to process a loan transaction, wherein the request is associated with a particular loan system. The method also includes determining, by a processor, the particular loan system associated with the request, determining one or more rules associated with the request and a selected one of the client access module and the particular loan system, and applying, by the processor, the one or more determined rules to the request using the account information.

Certain embodiments of the invention may provide one or more technical advantages. A technical advantage of one embodiment includes efficiently processing loan transactions associated with various loan systems. Another advantage includes processing loan transactions using a client access module. Through a single client access module, a client may access different loan systems. Providing the client access module may allow for a more streamlined and efficient client experience. Another technical advantage may include allowing a client to process loan transactions that are associated with pre-payment penalties and/or cash advances using the client access module. Still another benefit may include providing an enhanced client experience by initiating and/or processing requests that the client may not be authorized to complete.

Certain embodiments of the present disclosure may include none, some, or all of the above technical advantages. One or more other technical advantages may be readily apparent to one skilled in the art in view of the figures, descriptions, and claims of the present disclosure.

BRIEF DESCRIPTION OF THE DRAWINGS

For a more complete understanding of the present invention and its features and advantages, reference is now made to the following description, taken in conjunction with the accompanying drawings, in which:

FIGS. 3A, 3B, and 3C illustrate example graphical user interfaces according to various embodiments;

DETAILED DESCRIPTION OF THE INVENTION

Embodiments of the present invention and its advantages are best understood by referring to FIGS. 1 through 6, wherein like numerals refer to like and corresponding parts of the various drawings.

Figure 1:
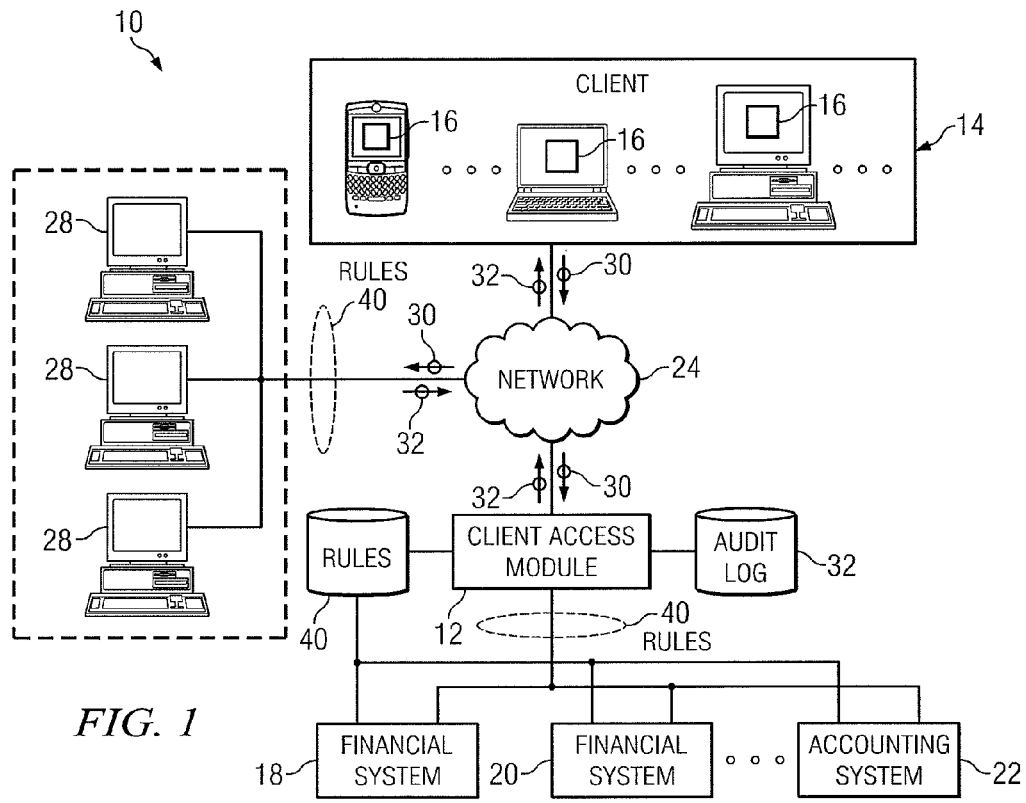
FIG. 1 is a block diagram illustrating an example embodiment of a system for processing loan transactions.

FIG. 1 is a block diagram illustrating an example embodiment of a system 10 for processing loan transactions. System 10 includes a Client Access Module (CAM) 12 that communicates information from financial system 18, financial system 20, and/or accounting system 22 to client 14 over network 24. CAM 12 may process information received from client 14 by applying one or more business rules 40. In some embodiments, CAM 12 may communicate information to one or more administrators 28. CAM 12 may also maintain an audit log 32.

Business entities have increasingly relied on the world wide web to communicate information with various entities. For example, the world wide web has been used to enable business applications and conduct business. Financial institutions have accordingly turned to the world wide web to provide banking solutions for such business entities. These banking solutions, however, have proved inadequate in various respects. For example, various financial transactions are associated with proprietary financial systems that do not provide for a seamless client experience through a client access module. As another example, many financial transactions, such as loan transactions associated with pre-payment penalties and/or cash advances, may not be performed using a conventional client access module. As yet another example, many financial transactions that require administrative approval may be denied and/or disabled. Thus, conventional solutions are prone to leaving clients with a negative overall experience. The teachings of the present disclosure recognize that it would be desirable to provide a system and method for processing loan transactions to minimize and/or avoid problems associated with conventional techniques to process loan transactions.

CAM 12 represents any suitable combination of hardware, software, and controlling logic operable to communicate information from financial system 18, financial system 20, and/or accounting system 22 to client 14 and/or administrators 28 over network 24. CAM 12 may present information from financial system 18, financial system 20, and/or accounting system 22 to client 14 on a graphical user interface (GUI) 16. CAM 12 may receive requests from client 14 to process financial transactions. CAM 12 may be operable to process such requests by applying one or more business rules 40. CAM 12 may represent a web portal for communicating with client 14 that includes a website for displaying information. CAM 12 may convert information from financial system 18, financial system 20, and/or accounting system 22 in order to provide information to client 14 in a common format. In some embodiments, CAM 12 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of CAM 12 may be performed by any suitable combination of one or more servers or other components at one or more locations. In the embodiment where the module is a server, the server may be a private server, and the server may be a virtual or physical server. The server may include one or more servers at the same or remote locations. Also, CAM 12 may include any suitable component that functions as a server. Details of an exemplary embodiment of CAM 12 are discussed in more detail with respect to FIG. 2 below.

Client 14 represents any suitable combination of hardware, software, and controlling logic capable of communicating with CAM 12 over network 24. Client 14 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10. A user of client 14 may interact with one or more web pages hosted by CAM 12. Additionally or in the alternative, a user of client 14 may communicate with financial system 18, financial system 20, and accounting system 22 by interacting with CAM 12. Client 14 may represent any number of clients and/or users. In the illustrated embodiment, client 14 includes a GUI 16. In some embodiments, client 14 may represent a user associated with a corporate entity, small business, real estate investment firm, or other commercial entity. Client 14 may also comprise a user interface, such as a display, a microphone, keypad, or other appropriate terminal equipment usable by a user.

GUI 16 represents any suitable graphical arrangement of information presented to the user and/or entered by a user of client 14. For example, GUI 16 may display information received from a website and/or CAM 12. GUI 16 is generally operable to tailor and filter data entered by and presented to the user. In some embodiments, GUI 16 may be displayed by a web browser associated with client 14. GUI 16 may provide the user with an efficient and user-friendly presentation of information. GUI 16 may comprise a plurality of displays having interactive fields, pull-down lists, and buttons operated by the user. GUI 16 may include multiple levels of abstraction including groupings and boundaries. It should be understood that the term GUI 16 may be used in the singular or in the plural to describe one or more GUIs 16 in each of the displays of a particular client 14. Examples of GUIs 16 generally operable to interact with CAM 12 and/or present information stored in audit log 32 are presented in FIGS. 3A, 3B, and 3C, which are described in greater detail below.

Financial system 18 represents any combination of hardware, software, and controlling logic to maintain financial information and/or communicate financial information to CAM 12. For example, financial system 18 maintains and processes information associated with one or more accounts of client 14. In some embodiments, financial system 18 maintains and processes information associated with complex financial transactions such as loan transactions. Financial system 18 may represent a proprietary loan transaction system. In various embodiments, financial system 18 is a commercial banking system that may be capable of processing loan transactions associated with client 14. For example, financial system 18 may process one or more of the following transactions: tiered commitments, flat and accrual fees, participations, syndications, late fees, collateral tracking, and indirect liabilities. Financial system 18 may store, communicate, and/or present information in one or more proprietary formats. In an embodiment, financial system 18 communicates using a proprietary format that is particular to financial system 18.

Financial system 20 represents any combination of hardware, software, and controlling logic to maintain financial information and/or communicate financial information to CAM 12. For example, financial system 20 may maintain information associated with one or more accounts of client 14. In some embodiments, financial system 20 maintains and processes information associated with complex financial transactions such as loan transactions. Financial system 20 may represent a proprietary loan transaction system that is different from financial system 18. In various embodiments, financial system 20 is a commercial banking system that may be capable of processing loan transactions associated with client 14. Such loan transactions typically may be associated with large business entities. For example, financial system 20 may process one or more of the following transactions: term loans, revolving lines of credit, syndications, participations, pricing options, flat and accrual fees, and multi-currency credits. Financial system 20 may store, communicate, and/or present information in one or more proprietary formats that are different from the formats utilized by financial system 18. In an embodiment, financial system 20 communicates using a proprietary format that is particular to financial system 20.

Accounting system 22 represents any combination of hardware, software, and controlling logic to maintain financial information and/or communicate financial information to CAM 12. For example, accounting system 22 may maintain information associated with one or more deposit accounts of client 14. Accounting system 22 may store, communicate, and/or present information in one or more proprietary formats that are different from the formats utilized by either financial system 18 or financial system 20. In an embodiment, accounting system 22 communicates using a proprietary format that is particular to accounting system 22.

Network 24 represents any suitable network operable to facilitate communication between the components of system 10 such as CAM 12, financial client 14, financial system 18, financial system 20, accounting system 22, and/or administrators 28. Network 24 may include any interconnecting system capable of transmitting audio, video, signals, data, messages, or any combination of the preceding. Network 24 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Administrators 28 represent one or more workstations, terminals, computers, and/or users. In some embodiments, administrators 28 may represent individuals in an enterprise, such as an operations center, capable of processing requests by client 14. In some embodiments, administrators 28 may be a qualified loan officer of an enterprise, such as a financial institution and/or a bank. Administrators 28 may be associated with one or more departments of a financial institution, one or more categories of requests, and/or may be qualified to process one or more categories of financial transactions. Administrators 28 may receive information from CAM 12 associated with a client 14 request. Information may be communicated to a particular administrator 28 based on the transaction category associated with the client 14 request. In some embodiments, CAM 12 communicates requests to administrator 28 based on one or more business rules 40.

Administrators 28 may be capable of validating the authorization associated with client 14. Because administrators 28 may be associated with one or more categories of requests, requests may be routed to a particular administrator 28 based on the category of the request. For example, a particular administrator 28 may be associated with loan transactions involving a pre-payment penalty and/or a cash advance. In addition or in the alternative, administrators 28 may be qualified to handle clients 14 based on a particular client 14's size and/or financial transaction needs. For example, a particular administrator 28 may handle clients 14 that are associated with large corporate entities. As another example, a particular administrator 28 may handle clients 14 whose financial transaction needs may be met by one or more of financial system 18, financial system 20, and/or accounting system 22. Administrators 28 may override CAM 12, financial system 18, financial system 20, and/or accounting system 22 and may authorize various requests that may otherwise be denied by CAM 12, financial system 18, financial system 20, and/or accounting system 22.

Audit log 32 represents any suitable database operable to store, either permanently or temporarily, information related to the operations of CAM 12. Audit log 32 may, for example, store historical records of financial transactions performed using CAM 12. In some embodiments, audit log 32 may be a relational database, such as a structured query language (SQL) database. Audit log 32 includes any one or a combination of volatile or non-volatile local or remote devices suitable for storing information. For example, audit log 32 may include random access memory (RAM), read only memory (ROM), magnetic storage devices, optical storage devices, or any other suitable information storage device or combination of these devices. Audit log 32 may include any suitable number and configuration of data structures necessary to store audit information related to transactions requested by client 14 and performed by CAM 12. While audit log 32 is illustrated as a separate module, audit log 32 may be included in CAM 12, a network storage server, a storage area network (SAN), and/or any appropriate component of system 10.

Rules 40 represent any suitable database and/or list of rules, queries, algorithms, code, standards, policies, limitations, and/or any number and combination of suitable instructions regarding processing financial transactions. CAM 12, financial system 18, financial system 20, and/or accounting system 22 may apply various rules 40 to a transaction request. Alternatively or additionally, CAM 12 may apply a particular rule to a transaction based on rules 40 associated with CAM 12, financial system 18, financial system 20, and/or accounting system 22. In an embodiment, rules 40 may determine whether client 14 is authorized to complete a transaction request. Rules 40 may be associated with any number and/or categories of transactions. In some embodiments, rules 40 may govern loan transactions associated with a prepayment penalty and/or a cash advance. Alternatively or additionally, rules 40 may govern whether a client 14 may access a particular account using CAM 12, whether the necessary funds and/or monies are available to complete the transaction, whether the client 14 is authorized for the financial transaction based on the amount and/or timing of the request, whether client 14 is associated with any transaction histories that may be associated with and/or any appropriate rules that may govern financial transactions. Based on the application of one or more rules 40, a transaction request may be communicated to administration center 28 for review. Rules 40 may serve to mitigate risk associated with client 14 using CAM 12 to conduct financial transactions. In some embodiments, rules 40 are based on risk associated with client 14. For example, rules 40 may be based on past payment history, credit history, and/or any other appropriate number and/or combination of factors that may govern client 14 risk.

In an exemplary embodiment of operation, CAM 12 communicates with the various components of system 10 to view financial information and/or process financial transactions for client 14. CAM 12 may receive a request 30 from client 14 to complete a financial transaction. CAM 12 determines the category of request 30 and applies one or more rules 40 associated with the category of request 30. Based on the application of rules 40, CAM 12 may then communicate with one or more of the financial system 18, financial system 20, and accounting system 22 to process request 30. CAM 12 may receive response 32 from financial system 18, financial system 20, and/or accounting system 22 in a proprietary format particular to that respective system. CAM 12 may convert response 32 into a common format and communicate response 32 to client 14. In some embodiments, CAM 12 presents response 32 to client 14 in a form on GUI 16.

CAM 12 may also communicate with administrators 28 of administration center 26 for further processing of request 30. For example, CAM 12 applies business rules 40 to request 30 to determine whether client 14 may complete request 30. CAM 12 communicates request 30 to administrator 28 for further processing if client 14 is not authorized to complete request 30. Administrators 28 may then review request 30 and communicate response 32 to client 14. Another exemplary embodiment of operation of CAM 12 is described in more detail with respect to FIG. 2 below.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 10 and the components within system 10.

Modifications, additions, or omissions may be made to system 10 without departing from the scope of the invention. For example, CAM 12 may communicate with any number and combination of financial systems and/or accounting systems to provide information to client 14. Additionally or alternatively, administrators 28 may include logic, hardware, and/or software to aid in processing requests at an enterprise. Furthermore, an enterprise may represent any number and/or combinations of suitable financial centers that may be located in geographically diverse locations.

Figure 2:
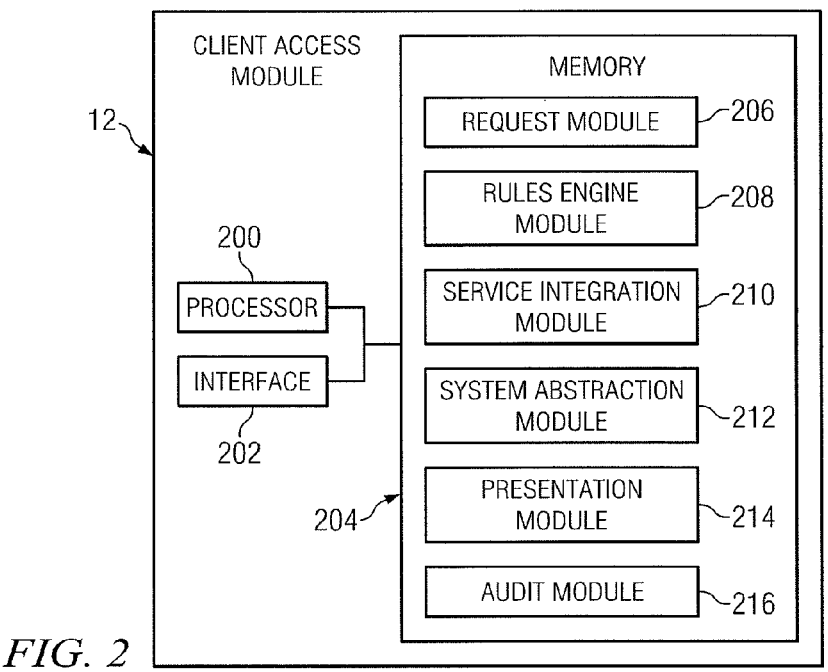
FIG. 2 is a block diagram illustrating an example embodiment of a device for processing loan transactions.

FIG. 2 is a block diagram illustrating an example embodiment of CAM 12. CAM 12 communicates with the various components of system 10 to process financial transactions. As illustrated, CAM 12 includes a processor 200, interface 202, memory 204, request module 206, rules engine module 208, service integration module 210, system abstraction module 212, presentation module 214, and audit module 216.

Processor 200 communicatively couples to interface 202 and memory 204, and controls the operation and administration of CAM 12 by processing information received from interface 202 and memory 204. Processor 200 includes any hardware and/or software that operates to control and process information. For example, processor 200 may process information from request module 206, service integration module 208, rules engine module 210, system abstraction module 212, presentation module 214, and/or audit module 216 to control the operation of CAM 12. Processor 200 may be a programmable logic device, a microcontroller, a microprocessor, any suitable processing device, or any suitable combination of the preceding.

Interface 202 represents any suitable device operable to receive information from network 24, transmit information through network 24, perform processing of information, communicate to other devices, or any combination of the preceding. For example, interface 202 receives information from client 14, financial system 18, financial system 20, and/or accounting system 22. As another example, interface 202 may communicate information to administrators 28. Interface 202 represents any port or connection, real or virtual, including any suitable hardware and/or software, including protocol conversion and data processing capabilities, to communicate through a LAN, WAN, SAN, and/or other communication system that allows CAM 12 to exchange information with network 24, clients 14, or other components of system 10.

Memory 204 stores, either permanently or temporarily, data, operational software, or other information for use by processor 200. Memory 204 includes any one or a combination of volatile or non-volatile local or remote devices suitable for storing information. For example, memory 204 may include RAM, ROM, magnetic storage devices, optical storage devices, or any other suitable information storage device or a combination of these devices. Memory 204 may include any suitable information for use in the operation of CAM 12. Memory 204 may store request module 206, rules engine module 208, service integration module 210, system abstraction module 212, presentation module 214, and audit module 216.

Request module 206, rules engine module 208, service integration module 210, system abstraction module 212, presentation module 214, and audit module 216 represent logic, rules, algorithms, code, queries, tables, and/or other suitable instructions for performing the described functions and operations of CAM 12. Request module 206 may include logic to receive and/or process requests from client 14. For example, request module 206 may receive one or more financial transaction requests from client 14. Request module 206 may perform initial processing on requests by, for example, determining whether the request involves financial system 18, financial system 20, and/or accounting system 22.

Rules engine module 208 may include rules 40 and may include logic to apply rules 40 to requests received from request module 206. For example, rules engine module 208 may apply one or more rules 40 to a financial transaction request, such as a loan transaction, that request module 206 receives from client 40.

Service integration module 210 may include logic to communicate with administrators 28 regarding one or more requests from client 14, such as financial transaction requests. Administrators 28 may service requests and, based on that review, may override authorizations determined by rules engine module 208. Thus, administrative service provided by administrators 28 may be integrated with the operation of CAM 12.

System abstraction module 212 may include logic to communicate with one or more of financial system 18, financial system 20, and/or accounting system 22. System abstraction module 212 may also convert proprietary formats associated with each respective financial system and/or accounting system into a common format. System abstraction module 212 may communicate such information in the common format to presentation module 214.

Presentation module 214 may include logic for communicating information to client 14. For example, presentation module 214 may facilitate the display of financial information to client 14 in a form on GUI 16.

Audit log 216 may include logic for tracking a history of loan transactions conducted by CAM 12. Audit module 216 may update a database of loan transactions completed by client 14, such as audit log 32. Audit module 216 may associate a request, client 14, associated account information, and the results of the transaction and store the association as one or more records in a database. Audit log 216 may be updated based on requests that are processed by CAM 12. Accordingly, audit log 216 may keep a record of historical loan transactions, which may be used for audit purposes.

While illustrated as request module 206, service integration module 208, rules engine module 210, system abstraction module 212, and presentation module 214, it should be understood that the functions of CAM 12 may be performed by any suitable combination of hardware, software, and/or controlling logic. For example, request module 206, rules engine module 208, service integration module 210, system abstraction module 212, and presentation module 214 may represent functionality of a single application program of CAM 12.

In an exemplary embodiment of operation, CAM 12 processes requests from client 14, presents financial information to client 14, and communicates information to administrators 28 for processing.

Client 14 may communicate information to CAM 12, such as requests for information maintained by financial system 18, financial system 20 and/or accounting system 22. For example, client 14 may request to view account information, to view obligation information, and/or to make and request loan transactions. The information may be related to accounts maintained by financial system 18, financial system 20, and/or accounting system 22. In addition or in the alternative, client 14 may request CAM 12 to process financial transactions such as loan transactions. The requests may include various information, such as the identity of the accounts associated with the request, the type of the request, the transaction amount, and/or the source or destination of payment. For example, client 14 may request to make a payment on a loan obligation associated with financial system 18 and/or financial system 20. Depending on the loan obligation, such payments may be associated with a pre-payment penalty. As another example, client 14 may request a cash advance on a loan obligation associated with financial system 18 and/or financial system 20. Client 14 may designate a deposit account associated with accounting system 22 as the source of a loan payment and/or the destination for cash advances. In an example embodiment, client 14 may request information by interacting with one or more pages of an interactive web portal provided by CAM 12.

Request module 206 receives a request communicated from client 14 that includes any of the aforementioned information. In some embodiments, request module 206 may receive a request that includes account information relating to client 14. Alternatively or additionally, request module 206 may receive account information that includes an identifier or other appropriate information operable to allow request module 206 to retrieve client 14's account information from financial system 18, financial system 20, and/or accounting system 22. Request module 206 performs initial processing of the request based on the account information and the request, such as determining whether the request is associated with one or more of financial system 18, financial system 20, and/or accounting system 22. For example, client 14 may request access to obligation information associated with client 14 that is maintained by financial system 18 and/or financial system 20. Alternatively or in addition, client 14 may request to complete a loan transaction. Upon receipt of the request, request module 206 may also determine a class of client 14. For example, client 14 may be associated with a large corporate entity, a small and medium business, and/or any number and combination of appropriate classes. Request module 206 may also determine whether the request is associated with financial system 18 and/or financial system 20 based on the class of client 14. After determining the financial system associated with the request, request module 206 transmits the request and the determined information to rules engine 208 for further processing. In some embodiments, request module 206 may also initiate presentation module 214 to communicate an initiation response to client 14. For example, an initiation response may indicate that processing of the request has been initiated.

Rules engine module 208 receives requests from request module 206 and processes the request by applying one or more rules 40 to the request. Rules engine module 208 determines one or more rules 40 associated with the request and CAM 12. These rules 40 may be applied to determine whether client 14 is authorized to complete the transaction through CAM 12. For example, client 14 may be authorized to view some obligations on behalf of an organization but not others. As another example, client 14 may not be authorized to view obligation information from financial system 18 and/or financial system 20. Based on a particular request, rules engine module 208 may determine that the particular request may need to be handled by an administrator 28 rather than by CAM 12. Rules engine module 208 may also determine rules 40 associated with the request and financial system 18, financial system 20, and/or accounting system 22. These rules 40 may be applied to determine whether client 14 is authorized to complete the request. If rules engine module 208 determines that client 14 is authorized to complete the request, rules engine module 208 may transmit such a request to system abstraction module 212 for further processing. If, however, rules engine module 208 determines that client 14 is not authorized to complete the request, rules engine module 208 may communicate information to service integration module 210. Thus, rules engine module 208 may determine if the user is authorized to view various information and/or complete various transactions.

In an embodiment, rules engine module 208 may determine that the request is a loan transaction that requests a cash advance. Rules engine module 208 may then determine one or more rules 40 associated with cash advances, and may apply those rules 40 using the account information associated with client 14. In another embodiment, rules engine module 208 may determine that the request is a loan transaction associated with a pre-payment penalty. Rules engine module 208 may then determine one or more rules 40 associated with pre-payment penalties, and may apply those rules 40 using the account information associated with client 14. If client 14 is not authorized to complete loan transactions associated with pre-payment penalties, the request may be denied and/or communicated to service integration module 210 for further processing.

Service integration module 210 may a receive request communicated by rules engine module 208 that indicates client 14 is not authorized to complete a particular request. For example, client 14 may not be authorized to complete requests associated with a pre-payment loan penalty, cash advances, and/or payoff requests for various loan obligations. Service integration module 210 determines characteristics associated with the request such as the type of loan, the amount of loan, and/or any number of other and appropriate characteristics associated with the request. Based on the characteristics, service integration module 210 may forward the request to an appropriate administrator 28. In some embodiments, administrator 28 is a qualified loan officer within an appropriate financial institution capable of handling the request in the category. Service integration module 210 may be capable of routing the request to an appropriate administrator 28, based on the administrator's qualifications, the capabilities of the financial institution, the category of the request, the geographic location of client 14 and/or administrator 28, and/or any number and combination of appropriate factors.

Administrator 28 may receive the request from CAM 12. Information received by administrator 28 may include information associated with client 14 such as account information, client 14's credit history, the category of the request, and/or any other appropriate information to enable administrator 28 to evaluate risk associated with client 14 and/or client 14's request. Administrator 28 may use appropriate information to validate the authorization of the request. For example, administrator 28 may initiate a validation process by which administrator 28 may determine whether or not client 14 may complete the request through CAM 12. If administrator 28 confirms that the request cannot be processed, administrator 28 may communicate directly to client 14 via electronic mail, phone call, text message or other appropriate communication methods. Therefore, CAM 12 may not indicate to client 14 that requests are denied. Instead, administrator 28 may communicate such denials to client 14 in a personalized manner, thereby enhancing the overall interaction in system 10.

In some embodiments, administrator 28 may provide additional information to CAM 12 as appropriate to complete the request. For example, administrator 28 may provide a payoff balance and/or the amount of a pre-payment penalty. If administrator 28 determines that CAM 12 may be used by client 14 to complete the request, administrator 28 may communicate an authorization override to CAM 12. Service integration module 210 may receive service authorization overrides from one or more administrators 28. Once an override has been received, service integration module 210 may communicate the request to system abstraction module 212 for completion. The override may reverse the authorization previously determined by rules engine module 208, thereby allowing client 14 to complete the particular request. Therefore, in some embodiments, client 14 may complete a request without being notified of the need for administrator 28 review.

System abstraction module 212 may receive requests that have been processed by rules engine module 208 and/or service integration module 210. System abstraction module 212 may gather the necessary information in order to complete the request and/or undertake any necessary and appropriate processing to complete the request. System abstraction module 212 may determine whether the request requires information from financial system 18, financial system 20, and/or accounting system 22. System abstraction module 212 may receive information from each system in that system's particular proprietary format and/or convert that information to a common format. Presentation module 214 may present and communicate the information to client 14 in the common format. For example, system abstraction module 212 may provide information to presentation module 214 such that presentation module 214 facilitates presentation of the information as one or more web pages of an interactive web portal. System abstraction module 212 may communicate with each system such that payments from deposit accounts in accounting system 22 are applied to loan obligations maintained by financial system 18 and/or financial system 20. In some embodiments, system abstraction module 212 may be capable of processing loan transactions that are associated with pre-payment penalties and/or cash advances. Thus, system abstraction module 212 may apply a payment and the pre-payment penalty to an obligation amount of one or more accounts of financial system 18 and/or financial system 20. System abstraction module 212 may correspondingly apply the payment and pre-payment penalty to one or more account balances associated with the account information of client 14, such as for example, a deposit account of accounting system 22. Similarly, system abstraction module 212 may be capable of providing a cash advance from an obligation associated with financial system 18 and/or financial system 20. In some embodiments, system abstraction module 212 may deposit cash advances in one or more appropriate deposit accounts of accounting system 22.

Presentation module 214 communicates information to client 14 associated with financial system 18, financial system 20 and accounting system 22 according to information requested by client 14. Presentation module 214 may facilitate the presentation of a summary of account information associated with client 14. Based on the requests that are processed by CAM 12, presentation module 214 may update the summary to indicate the responses to the processed requests. Presentation module 214 may facilitate the display of one or more web pages to client 214 through an interactive web portal. When a request is made by client 14, information is communicated to client 14 that the request has been initiated, whether or not the request has been authorized. Client 14 may thereby interact with CAM 12 without receiving request denials and/or rejections. It should be understood, however, that depending on rules 40 and the particular request, CAM 12 may nevertheless indicate denials and/or rejections to client 14. Presentation module 214 may present information to clients in the form of GUI 16, such as GUIs provided by way of example below in FIGS. 3A, 3B, and 3C.

Modifications, additions, or omissions may be made to CAM 12 without departing from the scope of the invention. For example, a particular enterprise may be responsible for communicating the request to the appropriate administrator 28. As another example, CAM 12 may provide an authorization success response if the application of the rules 40 indicates client 14 is authorized to complete the request and/or provide an initiation response if the application of rules 40 indicates the client is not authorized.

FIGS. 3A, 3B, and 3C illustrate example GUIs 16 according to various embodiments. In these examples, FIGS. 3A, 3B, and 3C are example web user interfaces. These example web user interfaces may receive any suitable information including, but not limited to, information from CAM 12. The web user interfaces present options for user input, which may allow a user of client 14 to manipulate and/or select the displayed data. Accordingly, GUI 16 may present views and/or reports of information from CAM 12, financial system 18, financial system 20, and/or accounting system 22. Alternatively or in addition, GUI 16 may provide a form for a user of client 14 to request a financial transaction.

For example, a user of client 14 may view financial information such as commercial credit balances from financial system 18, financial system 20, and/or accounting system 22 by clicking on Balances tab 302 of GUI 16, as illustrated in FIG. 3A. The financial information presented is not limited to data listed under "Commercial Credit Balances." Instead, a user may view additional financial information by, for example, clicking on Payments tab 304 to view a payment history and/or Advances tab 306 to view cash advances. In the embodiment illustrated by FIG. 3A, a user may also view a summary of invoice information. Data within each view may be sorted by clicking on an appropriate column header. The column headers illustrated in FIG. 3A include: "Customer Number," "Obligation Number," "Obligation Type," "Commitment Amount," "Available Amount," "Outstanding Principle Amount," and "Maturity Date." Any other suitable information may be presented on GUI 16. Alternatively or in addition, a column header may present a search field in which a user may enter one or more appropriate search terms.

As illustrated in FIG. 3B, a user of client 14 may request a financial transaction using GUI 16. As illustrated, a user may select one or more invoices to pay by, for example, clicking a radio button associated with an invoice and then selecting the next button. As illustrated in FIG. 3C, a user of client 14 may then select an account from which to pay the selected invoice. The account may, for example, be associated with accounting system 22, while the obligation may be associated with financial system 18 and/or financial system 20. As discussed above, the payment of the obligation amount may be associated with a pre-payment penalty. Similar forms may be provided to client 14 for requesting cash advances and other financial transactions.

It should be understood that the scope of the present disclosure is not limited to GUIs 16 illustrated by FIGS. 3A, 3B, and 3C, and these figures are merely examples of the manner in which financial information from the various components of system 10 may be presented and/or viewed.

Figure 4:
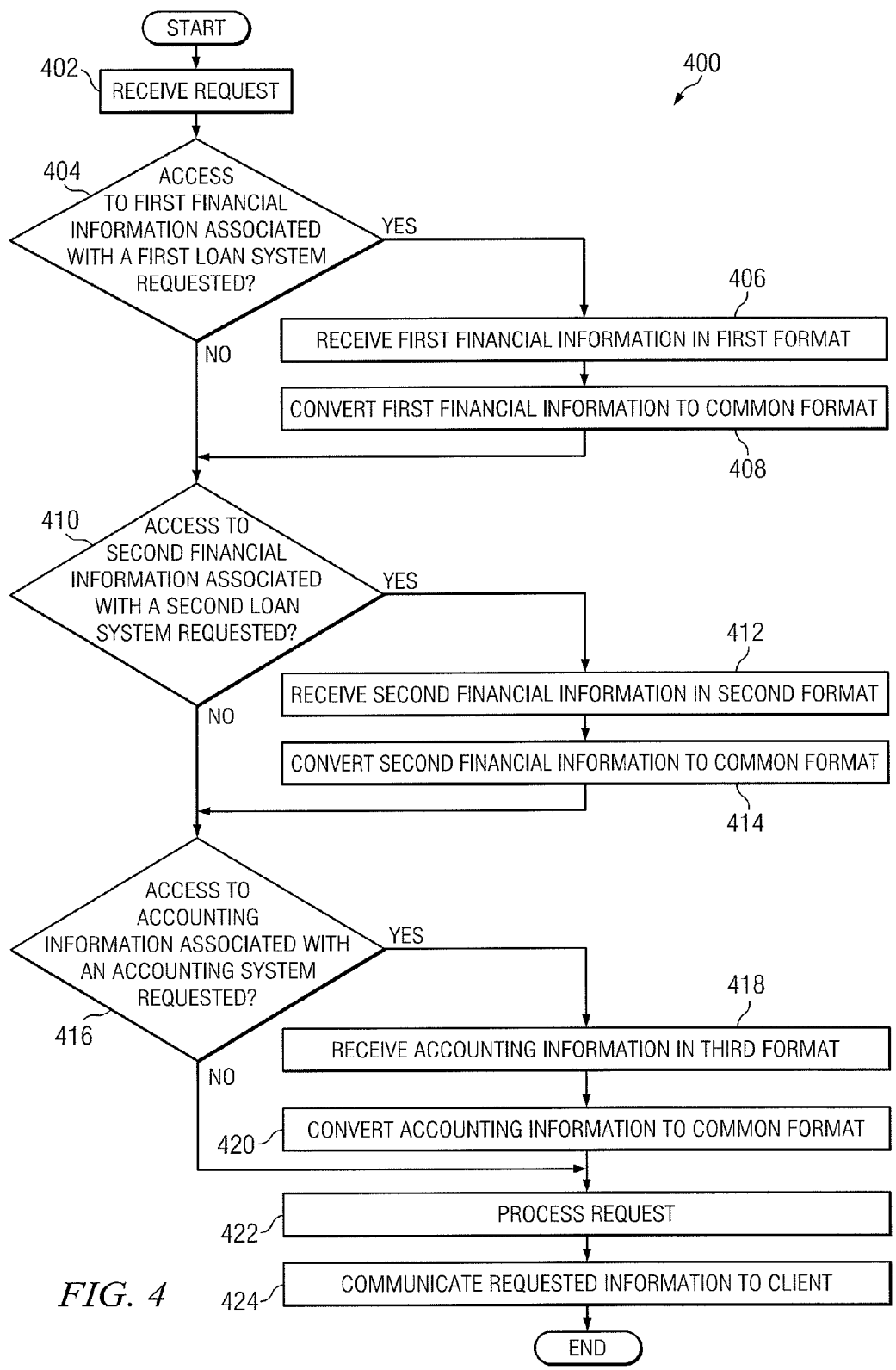
FIG. 4 is a flow chart illustrating an example method for processing loan transactions associated with particular financial systems.

FIG. 4 is a flow chart illustrating an example method 400 for processing loan transactions associated with particular financial systems. Method 400 begins at step 402 where a request for financial information is received. The request, for example, may be a request to view financial information and/or to complete a financial transaction. At step 404, CAM 12 determines whether access to first financial information associated with a first financial system is requested. That information may be financial information maintained and/or stored by financial system 18. If access to first financial information is requested, the first financial information is received in a first format from financial system 18 at step 406. The first format may be a proprietary format particular to financial system 18. CAM 12 may request information from financial system 18 and/or retrieve such information using financial system 18's particular proprietary protocols. After receiving the first financial information from financial system 18, CAM 12 converts the first information to a common format at step 408. For example, CAM 12 may convert the first information into a format suitable for viewing as a web page by client 14.

At step 410, method 400 determines whether access to second financial information associated with a second financial system is requested. That information may be financial information maintained and/or stored by financial system 20. If access to second financial information is requested, the second financial information is received in a second format from financial system 20 at step 412. The second format may be a proprietary format particular to financial system 20. CAM 12 may request information from financial system 20 and/or retrieve such information using financial system 20's particular proprietary protocols. After receiving the second financial information from financial system 20, CAM 12 converts the second information to a common format at step 414. For example, CAM 12 may convert the second information into a format suitable for viewing as a web page by client 14.

At step 416, method 400 determines whether access to accounting information associated with an accounting system is requested. That information may be accounting information maintained and/or stored by accounting system 22.

For example, a user of client 14 may request to view account balances of one or more accounts maintained by accounting system 22 and/or may request to pay a loan obligation using funds from one or more accounts of accounting system 22. If accounting information is requested, the accounting information is received in a third format from accounting system 22 at step 418. CAM 12 may request accounting information from accounting system 22 using accounting system 22's particular proprietary protocols. After receiving the accounting information from accounting system 22, CAM 12 converts the accounting information to a common format at step 420. For example, CAM 12 may convert the accounting information into a format suitable for viewing as a web page by client 14.

At step 422, the request is processed. CAM 12 may undertake appropriate processing to complete the request, such as any of the actions described above with respect to FIGS. 1 and 2. For example, CAM 12 may apply one or more business rules 40 to determine whether client 14 may complete the request. If client 14 is authorized to complete the request, CAM 12 may use the information received from financial system 18, financial system 20, and/or accounting system 22 to complete the request. At step 424, the requested information is communicated to client 14 and method 400 ends.

Modifications, additions, or omissions may be made to method 400 illustrated in the flowchart of FIG. 4. For example, method 400 may process several requests for access to data at once and/or in parallel. As another example, request processing may occur before and/or after financial information is received from financial system 18, financial system 20, and/or accounting system 22. Furthermore, method 400 may make multiple requests for information to each of financial system 18, financial system 20, and/or accounting system 22, as appropriate to complete the particular request being made by client 14. Additionally, the steps of FIG. 4 may be performed in parallel or in any suitable order.

Figure 5:
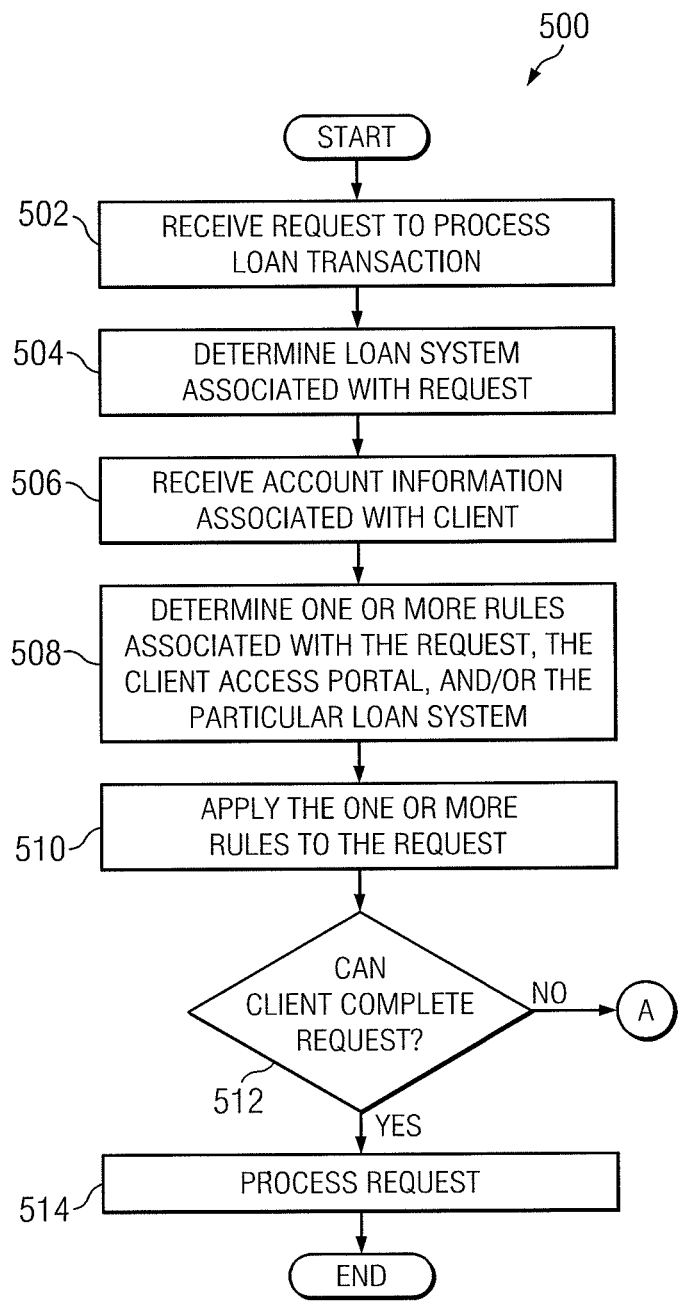
FIG. 5 is a flowchart illustrating an example method for processing loan transactions using one or more rules.

FIG. 5 is a flowchart illustrating an example method 500 for processing loan transactions using one or more rules. Method 500 begins at step 502, where a request to process a loan transaction is received. For example, CAM 12 may receive a request to process a loan transaction from client 14. At step 504, CAM 12 determines the loan systems associated with the request. For example, a request may include paying an obligation invoice on a loan associated with financial system 18 and/or financial system 20 using funds from a deposit account associated with accounting system 22.

At step 506, CAM 12 receives and/or retrieves account information associated with client 14. The account information may include financial information associated with client 14's loans and/or deposit accounts that may be associated with the requested transaction. Alternatively or in addition, the account information may include credit risk assessment information, payment and/or credit history, and/or any other information to assess the request.

At step 508, based on the request and/or client 14's account information, CAM 12 may determine one or more rules associated with the request, client 14's account information, CAM 12, and/or the financial and/or accounting systems associated with the request. In some embodiments, CAM 12 may store a set of rules associated with client 14's access to CAM 12. For example, client 14 may not have authorization to perform various functions using CAM 12. In addition or in the alternative, CAM 12 may store a set of rules associated with client 14's access to financial system 18, financial system 20, and/or accounting system 22. In some embodiments, CAM 12 may determine whether the request to process the loan transaction is associated with a pre-payment penalty.

CAM 12 may then determine one or more rules associated with the pre-payment penalty. CAM 12 may alternatively or additionally determine whether the request to process the loan transaction is associated with a cash advance. CAM 12 may then determine one or more rules associated with the cash advance.

At step 510, CAM 12 may apply the determined rules to the request to determine whether client 14 is authorized to complete the request. If the request is associated with a pre-payment penalty and/or cash advance, CAM 12 may, based on the account information, apply the associated rules to the request. CAM 12 may thus determine whether client 14 is authorized for loan transactions associated with pre-payment penalties and/or cash advances.

Figure 6:
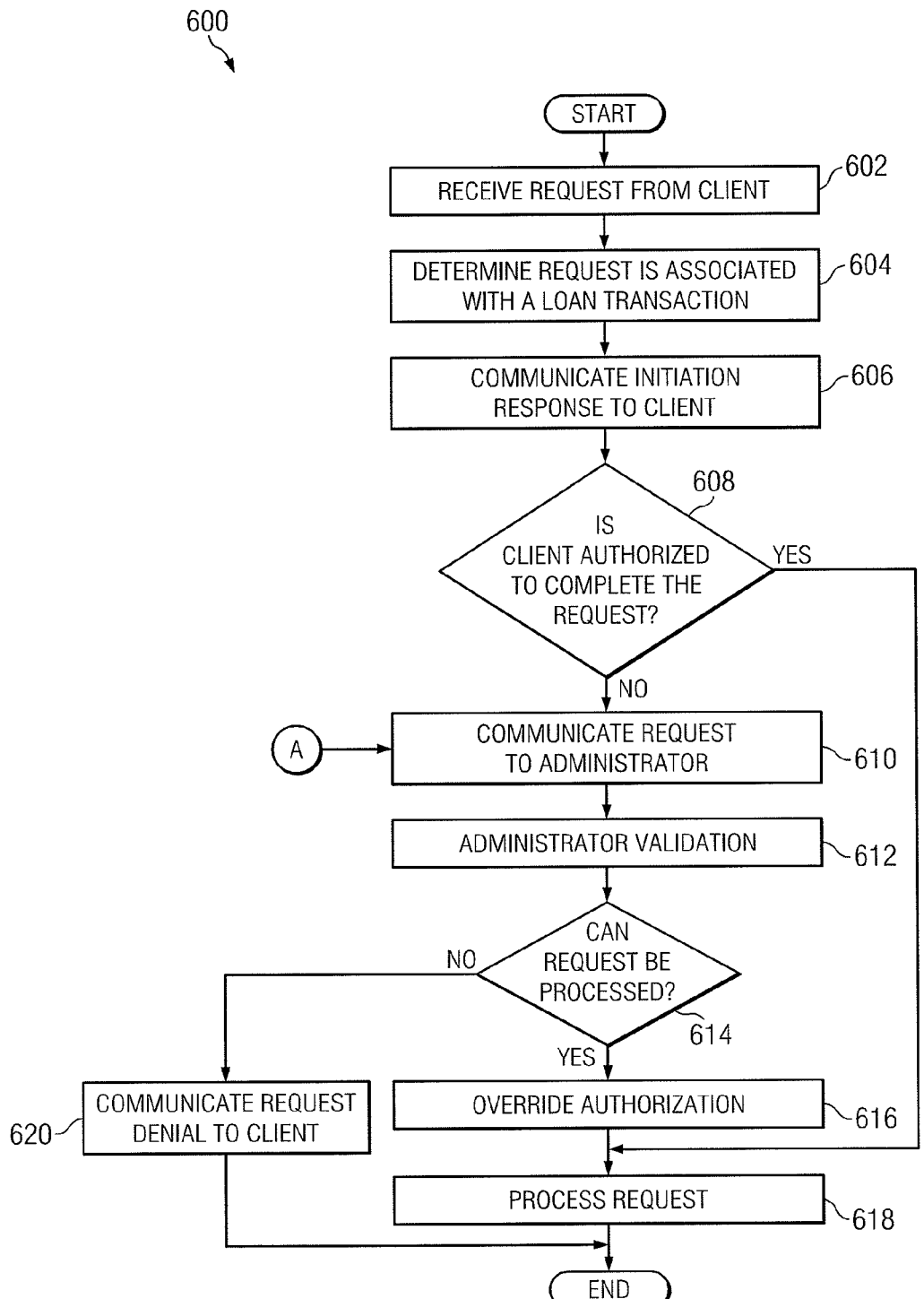
FIG. 6 is a flowchart illustrating an example method for processing loan transactions with administrative service integration.

Based on the application of the rules to the request, at step 512, CAM 12 determines whether client 14 is authorized to complete the request. If CAM 12 determines to deny the request, the process may continue as illustrated in FIG. 6. If, however, CAM 12 determines client 14 is authorized to complete the request, CAM 12 processes the request at step 514. CAM 12 may process the request, by for example, performing one or more of the steps previously discussed with respect to FIGS. 1, 2, and 4. If the request is a loan transaction requesting to pay an obligation invoice that is associated with a pre-payment penalty, CAM 12 may process the request by applying the payment and the pre-payment penalty to an account balance associated with the account information. If the request is a loan transaction associated with a cash advance, CAM 12 may debit a loan obligation appropriately and deposit the cash advance in a deposit account or other location designated by client 14. In some embodiments, processing the request includes facilitating the updating of information displayed to client 14. For example, CAM 12 may update one or more account summaries indicating that the requested loan transaction has been completed.

Modifications, additions, or omissions may be made to method 500 illustrated in the flowchart of FIG. 5. For example, method 500 may process several requests for access to data at once and/or in parallel. Additionally, the steps of FIG. 5 may be performed in parallel or in any suitable order.

FIG. 6 is a flowchart illustrating an example method 600 for processing loan transactions with administrative service integration. Method 600 begins at step 602, where CAM 12 receives a request from client 14. At step 604, CAM 12 determines that the request is associated with loan transaction.

At step 606, CAM 12 communicates an initiation response to client 14. The initiation response may indicate to client 14 that the request has been received and/or processing has been initiated.

CAM 12 determines at step 608 whether client 14 is authorized to complete the loan transaction. For example, CAM 12 may determine and apply one or more rules to the request. If CAM 12 determines that client 14 is not authorized to complete the request, CAM 12 may communicate the request to administrator 28 for review at step 610.

At step 612, administrator 28 validates the authorization determined by CAM 12. At step 614, administrator 28 determines whether the request can be processed. If administrator 28 determines at step 614 that the request can be processed, administrator 28 may communicate an authorization override to CAM 12 at step 616. In addition or in the alternative, administrator 28 may communicate information to CAM 12 that may enable CAM 12 to process the request. If, however, CAM 12 determines at step 614 that the request cannot be processed, administrator 28 may communicate the denial of the request to client 14 at step 620.

If CAM 12 determines that client 14 is authorized or if CAM 12 receives an authorization override from administrator 28, CAM 12 processes the request at step 618 and the method ends.

Modifications, additions, or omissions may be made to method 600 illustrated in the flowchart of FIG. 6. For example, method 600 may process several requests for access to data at once and/or in parallel. As another example, method 600 may only communicate an initiation response to client 14 after CAM 12 determines to deny the request and/or communicate the request to administrator 28. Additionally, the steps of FIG. 6 may be performed in parallel or in any suitable order.

According to the teachings of the present disclosure, one or more technical advantages may be realized. For example, a technical advantage of one embodiment includes efficiently processing loan transactions associated with various loan systems. Another advantage includes processing loan transactions using a client access module. Through a single client access module, a client may access different loan systems. Providing the client access module may allow for a more streamlined and efficient client experience. Another technical advantage may include allowing a client to process loan transactions that are associated with pre-payment penalties and/or cash advances using the client access module. Still another benefit may include providing an enhanced client experience by initiating and/or processing requests that the client may not be authorized to complete.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
  receiving, at a client access module, a request from a client to process a loan transaction, wherein the request is to make a payment or receive loan funds through the client access module and comprises account information and is associated with a particular loan system, wherein the client access module is configured to receive requests to make payments and receive loan funds;
  determining, by a processor, the particular loan system associated with the request;
  determining one or more rules associated with the request and a selected one of the client access module and the particular loan system, the rules associated with a pre-payment penalty when making the payment or receiving the loan funds through the client access module;
  applying, by the processor, the one or more determined rules to the request using the account information;
  based on the rules, determining, by the processor, whether the request is granted or preliminarily denied;
  based on a determination that the request is preliminarily denied, performing the following:
    transmitting a first message that causes first information to be displayed to the client via the client access module indicating that the request is being further processed while not indicating the determination of preliminary denial of the request;
    transmitting a second message to a reviewer requesting review of the preliminary denial; and
    upon receiving a third message from the reviewer that the preliminary denial is overruled, transmitting a fourth message that causes second information to be displayed to the client via the client access module indicating that the request is granted.

2. The method of claim 1, further comprising determining whether the request to process the loan transaction is associated with a prepayment penalty.

3. The method of claim 2, wherein the loan transaction comprises a payment and the method further comprises processing the loan transaction by applying the payment and the pre-payment penalty to an account balance associated with the account information.

4. The method of claim 2, further comprising:
  determining, based on the account information, whether the client is authorized for loan transactions associated with pre-payment penalties;
  if the client is not authorized for loan transactions associated with pre-payment penalties, determining to deny the request.

5. The method of claim 1, further comprising:
  maintaining an audit log associated with loan transaction requests; and
  updating the audit log based on the processed request.

6. The method of claim 1, further comprising:
  communicating a summary of the account information for display to the client;
  updating the summary of the account information to indicate the processed request.

7. The method of claim 1, further comprising:
  determining that the loan transaction is associated with a cash advance;
  determining one or more rules associated with the cash advance; and
  applying the one or more rules associated with the cash advance to the request using the account information.

8. The method of claim 1, further comprising:
  based on applying the one or more determined rules, determining, by the processor, to deny the request; and
  in response to determining, by the processor, to deny the request:
    communicating, by the client access module, a response indicating to the client that the request has been initiated; and
    communicating the request to an administrator, wherein the administrator determines to grant the request and to transmit an override message to the processor;
  receiving, by the processor, the override message; and
  based on receiving the override message, granting the request.

9. The method of claim 1, wherein the client access module is configured to facilitate presentation of an interactive display to a user on a web browser, the interactive display comprising:
  a first selectable tab element, wherein a selection of the first selectable tab element displays one or more invoice balances and one or more selectable options for making a payment to one or more of the invoice balances; and
  a second selectable tab element, wherein a selection of the second selectable tab element displays information associated with cash advances.

10. A non-transitory computer readable medium comprising logic, the logic, when executed by a processor, operable to:
  receive, at a client access module, a request from a client to process a loan transaction, wherein the request is to make a payment or receive loan funds through the client access module and comprises account information and is associated with a particular loan system, wherein the client access module is configured to receive requests to make payments and receive loan funds;
determine, by a processor, the particular loan system associated with the request;
determine one or more rules associated with the request and a selected one of the client access module and the particular loan system, the rules associated with a pre-payment penalty when making the payment or receiving the loan funds through the client access module;
apply, by the processor, the one or more determined rules to the request using the account information;
based on the rules, determine, by the processor, whether the request is granted or preliminarily denied;
based on a determination that the request is preliminarily denied, perform the following:
transmit a first message that causes first information to be displayed to the client via the client access module indicating that the request is being further processed while not indicating the determination of preliminary denial of the request;
transmit a second message to a reviewer requesting review of the preliminary denial; and
upon receiving a third message from the reviewer that the preliminary denial is overruled, transmit a fourth message that causes second information to be displayed to the client via the client access module indicating that the request is granted.

11. The computer readable medium of claim 10, the logic further operable to determine whether the request to process the loan transaction is associated with a pre-payment penalty.

12. The computer readable medium of claim 11, wherein the loan transaction comprises a payment and the logic is further operable to process the loan transaction by applying the payment and the pre-payment penalty to an account balance associated with the account information.

13. The computer readable medium of claim 11, the logic further operable to:
determine, based on the account information, whether the client is authorized for loan transactions associated with pre-payment penalties;
if the client is not authorized for loan transactions associated with pre-payment penalties, determine to deny the request.

14. The computer readable medium of claim 10, the logic further operable to:
maintain an audit log associated with loan transaction requests; and
update the audit log based on the processed request.

15. The computer readable medium of claim 10, the logic further operable to:
communicate a summary of the account information for display to the client;
update the summary of the account information to indicate the processed request.

16. The computer readable medium of claim 10, the logic further operable to:
based on applying the one or more determined rules, determine, by the processor, to deny the request; and
in response to determining, by the processor, to deny the request:
communicate, by the client access module, a response indicating to the client that the request has been initiated; and
communicate the request to an administrator, wherein the administrator determines to grant the request and to transmit an override message to the processor;
receive, by the processor, the override message; and
based on receiving the override message, grant the request.

17. The computer readable medium of claim 10, wherein the client access module is configured to facilitate presentation of an interactive display to a user on a web browser, the interactive display comprising:
a first selectable tab element, wherein a selection of the first selectable tab element displays one or more invoice balances and one or more selectable options for making a payment to one or more of the invoice balances; and
a second selectable tab element, wherein a selection of the second selectable tab element displays information associated with cash advances.

18. An apparatus, comprising:
an interface operable to receive, at a client access module, a request from a client to process a loan transaction, wherein the request is to make a payment or receive loan funds through the client access module and comprises account information and is associated with a particular loan system, wherein the client access module is configured to receive requests to make payments and receive loan funds; and
a processor operable to:
determine the particular loan system associated with the request;
determine one or more rules associated with the request and a selected one of the client access module and the particular loan system, the rules associated with a prepayment penalty when making the payment or receiving the loan funds through the client access module;
apply the one or more determined rules to the request using the account information;
based on the rules, determine, by the processor, whether the request is granted or preliminarily denied;
based on a determination that the request is preliminarily denied, perform the following:
transmit a first message that causes first information to be displayed to the client via the client access module indicating that the request is being further processed while not indicating the determination of preliminary denial of the request;
transmit a second message to a reviewer requesting review of the preliminary denial; and
upon receiving a third message from the reviewer that the preliminary denial is overruled, transmit a fourth message that causes second information to be displayed to the client via the client access module indicating that the request is granted.

19. The apparatus of claim 18, the processor further operable to determine whether the request to process the loan transaction is associated with a pre-payment penalty.

20. The apparatus of claim 19, wherein the loan transaction comprises a payment and the processor is further operable to process the loan transaction by applying the payment and the pre-payment penalty to an account balance associated with the account information.

21. The apparatus of claim 19, the processor further operable to:
determine, based on the account information, whether the client is authorized for loan transactions associated with pre-payment penalties;
if the client is not authorized for loan transactions associated with pre-payment penalties, determine to deny the request.

22. The apparatus of claim 18, the processor further operable to:

maintain an audit log associated with loan transaction requests; and update the audit log based on the processed request.

23. The apparatus of claim 18, the processor further operable to:

communicate a summary of the account information for display to the client;

update the summary of the account information to indicate the processed request.

24. The apparatus of claim 18, further operable to:

based on applying the one or more determined rules, determine, by the processor, to deny the request; and in response to determining, by the processor, to deny the request:

communicate, by the client access module, a response indicating to the client that the request has been initiated; and communicate the request to an administrator, wherein the administrator determines to grant the request and to transmit an override message to the processor;

receive, by the processor, the override message; and based on receiving the override message, grant the request.

25. The apparatus of claim 18, wherein the client access module is configured to facilitate presentation of an interactive display to a user on a web browser, the interactive display comprising:

a first selectable tab element, wherein a selection of the first selectable tab element displays one or more invoice balances and one or more selectable options for making a payment to one or more of the invoice balances; and a second selectable tab element, wherein a selection of the second selectable tab element displays information associated with cash advances.

26. A system, comprising:

means for receiving, at a client access module, a request from a client to process a loan transaction, wherein the request is to make a payment or receive loan funds through the client access module and comprises account information and is associated with a particular loan system, wherein the client access module is configured to receive requests to make payments and receive loan funds;

means for determining, by a processor, the particular loan system associated with the request;

means for determining one or more rules associated with the request and a selected one of the client access module and the particular loan system, the rules associated with a prepayment penalty when making the payment or receiving the loan funds through the client access module;

means for applying, by the processor, the one or more determined rules to the request using the account information;

based on the rules, means for determining, by the processor, whether the request is granted or preliminarily denied;

based on a determination that the request is preliminarily denied, means performing the following:

transmitting a first message that causes first information to be displayed to the client via the client access module indicating that the request is being further processed while not indicating the determination of preliminary denial of the request;

transmitting a second message to a reviewer requesting review of the preliminary denial; and upon receiving a third message from the reviewer that the preliminary denial is overruled, transmitting a fourth message that causes second information to be displayed to the client via the client access module indicating that the request is granted.

* * * * *